(12) United States Patent
Kodo

(10) Patent No.: US 8,459,006 B2
(45) Date of Patent: Jun. 11, 2013

(54) TEMPERATURE CONTROL DEVICE FOR CATALYST

(75) Inventor: Satoshi Kodo, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 524 days.

(21) Appl. No.: 12/684,766

(22) Filed: Jan. 8, 2010

(65) Prior Publication Data

US 2010/0199640 A1 Aug. 12, 2010

(30) Foreign Application Priority Data

Feb. 12, 2009 (JP) .................................. 2009/029512

(51) Int. Cl.
*F02M 25/06* (2006.01)

(52) U.S. Cl.
USPC .................................. 60/278; 60/299; 60/285

(58) Field of Classification Search
USPC .................................... 60/278, 285, 299, 276
See application file for complete search history.

(56) References Cited

U.S. PATENT DOCUMENTS

| | | | | |
|---|---|---|---|---|
| 5,201,173 A | * | 4/1993 | Fujimoto et al. | 60/277 |
| 5,303,168 A | * | 4/1994 | Cullen et al. | 700/299 |
| 5,910,096 A | * | 6/1999 | Hepburn et al. | 60/274 |
| 5,974,792 A | | 11/1999 | Isobe | |
| 2005/0252198 A1 | | 11/2005 | Okugawa et al. | |
| 2007/0186541 A1 | * | 8/2007 | Haft | 60/285 |

FOREIGN PATENT DOCUMENTS

| | | |
|---|---|---|
| DE | 10154041 A1 | 5/2003 |
| EP | 1132584 A2 | 9/2001 |
| EP | 1375878 A2 | 1/2004 |
| JP | 06-017641 A | 1/1994 |
| JP | 2000038948 A | 2/2000 |
| JP | 2000-320386 A | 11/2000 |
| JP | 2000320386 A * | 11/2000 |
| JP | 2002-180871 A | 6/2002 |
| WO | WO-2004/104389 A1 | 12/2004 |

OTHER PUBLICATIONS

Office Action cited in corresponding EP Application No. 101513760-1267, dated Jun. 21, 2012.

* cited by examiner

*Primary Examiner* — Thomas Denion
*Assistant Examiner* — Matthew T Largi
(74) *Attorney, Agent, or Firm* — Arent Fox LLP

(57) ABSTRACT

A temperature control device for a catalyst, which is capable of rapidly activating a catalyst while maintaining reduced exhaust emissions, by properly controlling the temperature of exhaust gases according to an activated state of the catalyst. If the catalyst is determined not to be in the activated state, based on an acquired temperature of the catalyst, the temperature control device for a catalyst sets a temperature higher than the temperature of the catalyst by a predetermined temperature is set as a target exhaust gas temperature. Further, the temperature control device controls a combustion control parameter including at least one of an amount of recirculation of exhaust gases by an EGR device, an amount of intake air drawn into an engine, a supply amount and a supply timing of fuel supplied into the engine, according to the set target exhaust gas temperature.

2 Claims, 13 Drawing Sheets

TEMPERATURE CONTROL DEVICE FOR CATALYST

BACKGROUND OF THE INVENTION

1. Field of the Invention

The present invention relates to a temperature control device for a catalyst, which controls the temperature of a catalyst which purifies exhaust gases discharged from an internal combustion engine.

2. Description of the Related Art

Conventionally, as a temperature control device of this kind, one disclosed in Japanese Laid-Open Patent Publication (Kokai) No. 2000-320386 is known. In this temperature control device, when a catalyst is not in an activated state, fuel is supplied to an internal combustion engine in three divided times, whereby the temperature of exhaust gases is raised, which causes the temperature of the catalyst to be raised. The amount of fuel supplied in a single time is set to ⅓ of the total amount of fuel supply, and this total amount of fuel supply is calculated by adding a predetermined correction term to a base value of the amount of fuel supply calculated according to the rotational speed of the engine and a demanded torque. Further, the timing of fuel supply is set such that a time interval between the first-time supply and the second-time supply, and a time interval between the second-time supply and the third-time supply are respective fixed time intervals equal to each other. On the other hand, when the catalyst is in the activated state, one-time supply of fuel to the engine is performed. The amount of fuel for the one-time supply is calculated according to the engine speed and the demanded torque.

It is effective in promoting the activation of the catalyst and promptly ensuring the purification ability of the catalyst to increase the amount of fuel supply when the catalyst is not in the activated state as in the above-mentioned conventional temperature control device. However, if such combustion is performed as will make higher the temperature of exhaust gases, unburned fuel contained in the exhaust gases increases. Further, even if the temperature of exhaust gases is rapidly raised, the temperature of the catalyst does not immediately follow this. On the other hand, in the conventional temperature control device, when the catalyst is not in the activated state, the amount of fuel supply is merely calculated according to the engine speed and the demanded torque to raise the temperature of exhaust gases, irrespective of the temperature of the catalyst. Therefore, there is a case where high-temperature exhaust gases containing a lot of unburned fuel are supplied to the catalyst which is not sufficiently activated, and in this case, there is a fear that the unburned fuel is emitted into the air without being completely purified, resulting in an increase in exhaust emissions.

Further, in the conventional temperature control device, the fuel supply is performed at fixed equal intervals, the entire combustion time period over which combustion is performed in one combustion cycle is substantially fixed. For this reason, if the combustion time period is short, it is difficult for the temperature of exhaust gases to be raised, whereby it is impossible to rapidly raise the temperature of the catalyst and hence it is impossible to rapidly activate the catalyst, which increases exhaust emissions. Inversely, if the combustion time period is long, the temperature of exhaust gases becomes too high, which also increases exhaust emissions.

Further, if the temperature of the catalyst is too high, the ability of the catalyst for purifying exhaust gases by the catalyst tends to be lowered. On the other hand, in the conventional temperature control device, when the catalyst is in the activated state, the amount of fuel supply is calculated according to the engine speed and the demanded torque, irrespective of the temperature of the catalyst. Therefore, there is a case where as the temperature of exhaust gases becomes higher, the temperature of the catalyst becomes too high, and in this case, there is a fear that the exhaust gases are emitted into the air without being sufficiently purified due to degradation of the purification ability of the catalyst, which increases exhaust emissions.

SUMMARY OF THE INVENTION

It is an object of the present invention to provide a temperature control device for a catalyst, which is capable of rapidly activating a catalyst while maintaining reduced exhaust emissions, by properly controlling the temperature of exhaust gases according to an activated state of the catalyst.

To attain the above object, in a first aspect of the present invention, there is provided a temperature control device for a catalyst for controlling temperature of the catalyst which purifies exhaust gases discharged from an internal combustion engine, comprising temperature acquisition means for acquiring a temperature of the catalyst, activated state-determining means for determining based on the acquired temperature of the catalyst whether or not the catalyst is in an activated state, target exhaust gas temperature-setting means for setting a temperature which is higher than the temperature of the catalyst by a first predetermined temperature, as a target exhaust gas temperature, when the activated state-determining means determines that the catalyst is not in the activated state, an EGR device that recirculates part of exhaust gases discharged into an exhaust passage to an intake passage, fuel supply means for supplying fuel to the engine, and control means for controlling a combustion control parameter including at least one of an amount of recirculation of exhaust gases by the EGR device, an amount of intake air drawn into the engine, and a supply amount and a supply timing of fuel to be supplied by the fuel supply means, according to the set target exhaust gas temperature.

With the configuration of the temperature control device for a catalyst according to the first aspect of the present invention, it is determined whether or not the catalyst is in the activated state based on the acquired temperature of the catalyst, and when it is determined that the catalyst is not in the activated state, the temperature higher than the acquired temperature of the catalyst by the first predetermined temperature is set as the target exhaust gas temperature. Then, according to the set target exhaust gas temperature, the combustion control parameter is controlled which includes at least one of the amount of recirculation of exhaust gases by the EGR device, the amount of intake air drawn into the engine, and the supply amount and supply timing of fuel to be supplied by the fuel supply means.

As described above, when the catalyst is not in the activated state, the temperature higher than the temperature of the catalyst by the first predetermined temperature is set as the target exhaust gas temperature. Therefore, it is possible to properly set the target exhaust gas temperature according to the actual temperature of the catalyst at the time. Further, the combustion control parameter defined as mentioned above has a correlation with the combustion state, and is capable of controlling the temperature of exhaust gases. Therefore, by controlling the combustion control parameter according to the target exhaust gas temperature, it is possible to raise the temperature of the catalyst, while preventing the temperature of exhaust gases from becoming too high. This makes it possible to rapidly activate the catalyst, while giving a higher priority to the reduction of unburned fuel emissions due to a rise in the temperature of exhaust gases and maintaining reduced exhaust emissions.

Preferably, the target exhaust gas temperature-setting means sets a temperature which is lower than a predetermined activation temperature by a second predetermined temperature as the target exhaust gas temperature, when it is determined that the catalyst is in the activated state.

With the configuration of this preferred embodiment, when it is determined that the catalyst is in the activated state, the target exhaust gas temperature is set as the temperature lower than the predetermined activation temperature by the second predetermined temperature. Therefore, it is possible to maintain the temperature of exhaust gases as low as possible, while preventing the temperature of the catalyst from becoming too high or too low and properly maintaining the temperature and the purification ability of the catalyst. As a consequence, it is possible to reduce the amount of emission of unburned fuel and emission elements, such as CO and NOx, into the air to an maximum extent, thereby making it possible to decrease exhaust emissions. Further, it is possible to prevent the temperature of exhaust gas from being unnecessarily raised, and hence it is possible to reduce the amount of fuel consumption by the corresponding amount.

To attain the above object, in a second aspect of the present invention, there is provided a temperature control device for a catalyst for controlling temperature of the catalyst which purifies exhaust gases discharged from an internal combustion engine, comprising temperature acquisition means for acquiring a temperature of the catalyst, activated state-determining means for determining based on the acquired temperature of the catalyst whether or not the catalyst is in an activated state, target exhaust gas temperature-setting means for setting a temperature which is higher than the temperature of the catalyst by a first predetermined temperature, as a target exhaust gas temperature, when the activated state-determining means determines that the catalyst is not in the activated state, fuel supply means for supplying fuel to the engine, and control means for controlling a fuel supply parameter including at least one of a supply amount and a supply timing of fuel to be supplied by the fuel supply means, according to the set target exhaust gas temperature.

With the configuration of the temperature control device for a catalyst according to the second aspect of the present invention, it is determined whether or not the catalyst is in the activated state based on the acquired temperature of the catalyst, and when it is determined that the catalyst is not in the activated state, the temperature higher than the acquired temperature of the catalyst by the first predetermined temperature is set as the target exhaust gas temperature. Then, according to the set target exhaust gas temperature, the fuel supply parameter is controlled which includes at least one of the supply amount and supply timing of fuel to be supplied by the fuel supply means.

As described above, when the catalyst is not in the activated state, the temperature higher than the temperature of the catalyst by the first predetermined temperature is set as the target exhaust gas temperature. Therefore, it is possible to properly set the target exhaust gas temperature according to the actual temperature of the catalyst at the time. Further, the fuel supply parameter defined as mentioned above has a correlation with the combustion state, and is capable of controlling the temperature of exhaust gases. Therefore, by controlling the fuel supply parameter according to the target exhaust gas temperature, it is possible to raise the temperature of the catalyst, while preventing the temperature of exhaust gases from being becoming too high. This makes it possible to rapidly activate the catalyst, while giving a higher priority to the reduction of unburned fuel emissions due to a rise in the temperature of exhaust gases and maintaining reduced exhaust emissions.

Preferably, the target exhaust gas temperature-setting means sets a temperature which is lower than a predetermined activation temperature by a second predetermined temperature as the target exhaust gas temperature, when it is determined that the catalyst is in the activated state.

With the configuration of this preferred embodiment, it is possible to obtain the same advantageous effects as provided by the preferred embodiment of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
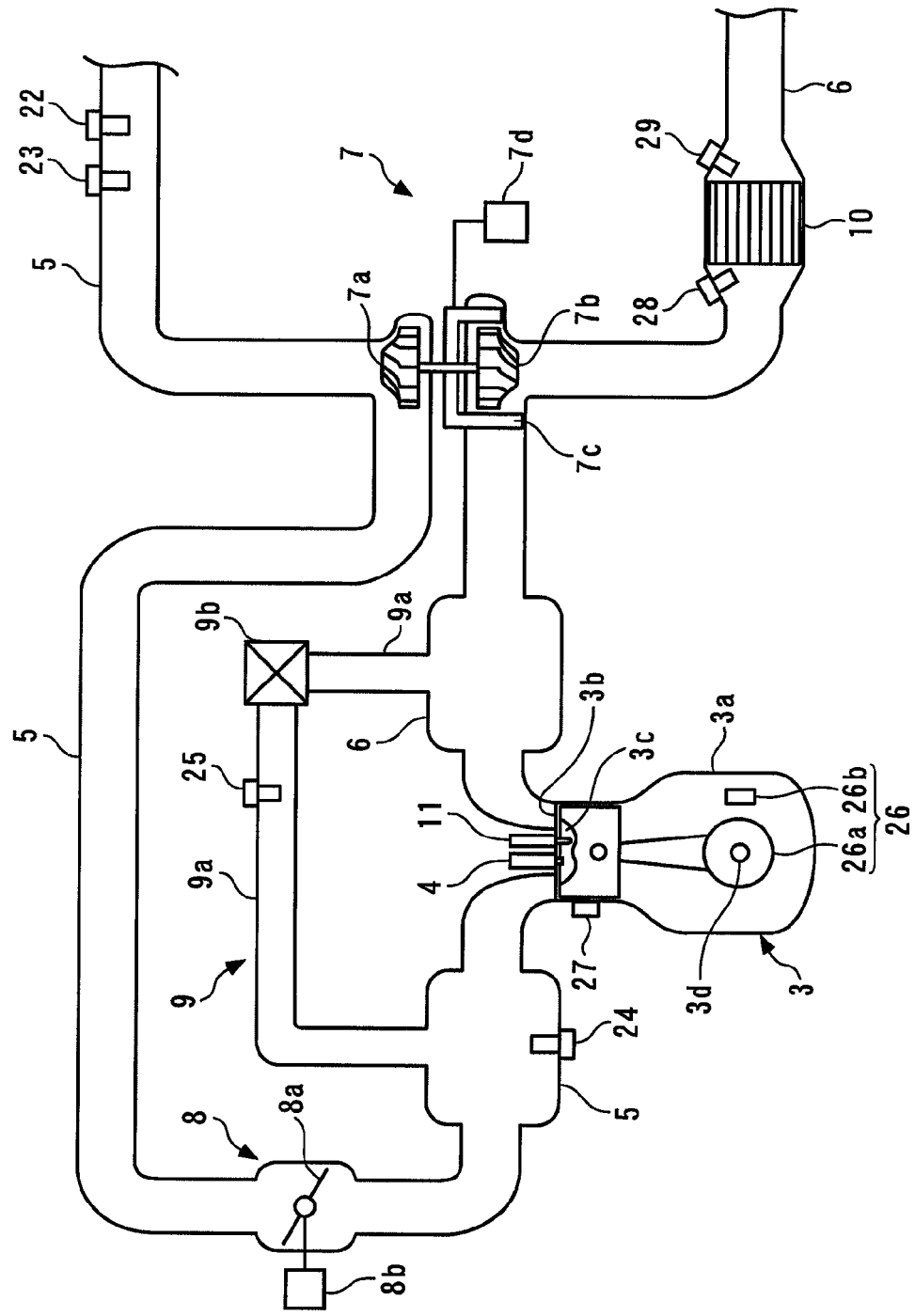
FIG. 1 is a schematic view of the arrangement of an internal combustion engine to which the present invention is applied.
Figure 2:
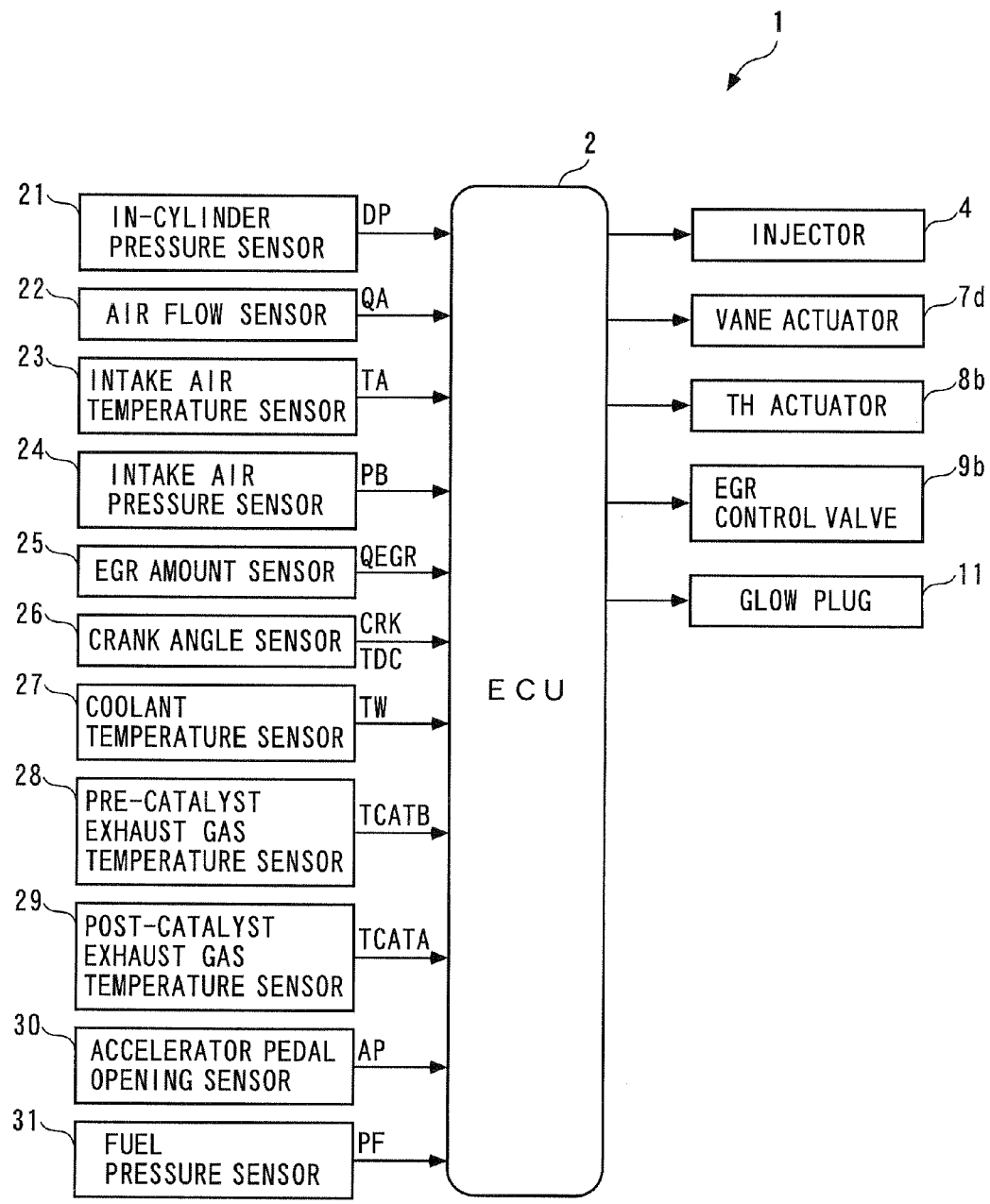
FIG. 2 is a schematic block diagram of a temperature control device according to a first embodiment of the present invention.

The invention will now be described in detail with reference to the drawings showing preferred embodiments thereof. Referring to FIG. 2, a temperature control device 1 according to a first embodiment of the present invention includes an ECU 2 for carrying out various kinds of control including control of the temperature of a catalyst 10, referred to hereinafter, and is applied to an internal combustion engine (hereinafter simply referred to as "the engine") 3 shown in FIG. 1. The engine 3 is a diesel engine installed on a vehicle (not shown), and has e.g. four cylinders 3a (only one of which is shown).

A cylinder head 3b of the engine 3 has a fuel injection valve (hereinafter referred to as "the injector") 4 and a glow plug 11 mounted therethrough for each associated cylinder such that they face a combustion chamber 3c of the associated cylinder. The valve-opening time period and the valve-opening timing of the injector 4 are controlled by a drive signal from the ECU 2, whereby a fuel injection amount and fuel injection timing are controlled. Further, when not in cold operation, the engine 3 performs a single injection in which fuel is injected only once between the suction stroke and the compression stroke. Further, when in cold operation, the engine 3 performs a multi-injection in which fuel is injected during a predetermined time period between the compression stroke and the expansion stroke is performed. In the multi-injection, fuel is injected in a plurality of divided times (e.g. 5 times).

The glow plug 11 is used for assisting ignition within the cylinder 3a. This glow plug 11 is connected to a battery (not shown) via an electrode (not shown), and generates heat by electric power supplied from the battery, to thereby heat the inside of the cylinder 3a. The energization timing and the energization time of the glow plug 11 are controlled by a control signal from the ECU 2.

An in-cylinder pressure sensor 21 is attached to the glow plug 11 (see FIG. 2). This in-cylinder pressure sensor 21 detects an amount DP of change in pressure in the cylinder 3a (hereinafter simply referred to as "the in-cylinder pressure change amount") of the engine 3, and delivers a signal indicative of the sensed in-cylinder pressure change amount DP to the ECU 2. The ECU 2 calculates an in-cylinder pressure PCYL based on the in-cylinder pressure change amount DP.

The engine 3 is provided with a turbocharger 7. The turbocharger 7 is comprised of a compressor blade 7a disposed in an intake passage 5, a turbine blade 7b disposed in an exhaust passage 6, for rotating in unison with the compressor blade 7a, a plurality of variable vanes 7c (only two of which are shown), and a vane actuator 7d for actuating the variable vanes 7c.

In the turbocharger 7, as the turbine blade 7b is driven for rotation by exhaust gases flowing through the exhaust passage 6, the compressor blade 7a integrally formed with the turbine blade 7b is also rotated, whereby the turbocharger 7 is caused to perform a supercharging operation for supercharging intake air.

The variable vanes 7c are pivotally mounted on a wall portion of a housing (not shown) for accommodating the turbine blade 7b, and are mechanically connected to the vane actuator 7d. The degree of opening of the variable vanes 7c is controlled by the ECU 2 via the vane actuator 7d, whereby the amount of exhaust gases blown to the turbine blade 7b is changed to change the rotational speeds of the turbine blade 7b and the compressor blade 7a, to thereby control the boost pressure.

Further, an air flow sensor 22, an intake air temperature sensor 23, a throttle valve mechanism 8, and an intake air pressure sensor 24 are provided at respective locations of the intake passage 5 from upstream to downstream in the mentioned order. The air flow sensor 22 and the intake air temperature sensor 23 are disposed at respective locations upstream of the compressor blade 7a, for detecting an intake air amount QA drawn into the engine 3 and a temperature TA in the intake passage 5 (hereinafter referred to as "the intake air temperature TA"), respectively, to deliver signals indicative of the sensed intake air amount QA and the sensed intake air temperature TA to the ECU 2. The intake air pressure sensor 24 detects a pressure PB in the intake passage 5 (hereinafter referred to as "the intake air pressure PB"), and delivers a signal indicative of the sensed intake air pressure PB to the ECU 2.

The throttle valve mechanism 8 includes a throttle valve 8a and a TH actuator 8b for actuating the throttle valve 8a. The throttle valve 8a is pivotally disposed in the intake passage 5. The TH actuator 8b is a combination of a motor and a reduction gear mechanism (none of which are specifically shown). The degree of opening of the throttle valve 8a is controlled by the ECU 2 via the TH actuator 8b, whereby the intake air amount flowing through the throttle valve 8a is controlled.

The engine 3 is provided with an EGR device 9. This EGR device 9 recirculates part of exhaust gases discharged into the exhaust passage 6 to the intake passage 5, and is comprised of an EGR passage 9a which connects between a portion of the intake passage 5 downstream of the compressor blade 7a and a portion of the exhaust passage 6 upstream of the turbine blade 7b, and an EGR control valve 9b for opening and closing the EGR passage 9a.

The EGR control valve 9b is implemented by a solenoid valve of which the valve lift is continuously changed between a maximum value and a minimum value, and is electrically connected to the ECU 2. The ECU 2 changes the degree of opening of the EGR passage 9a via the EGR control valve 9b, to thereby control an amount of recirculation of exhaust gases (hereinafter referred to as "the EGR amount") recirculated through the EGR passage 9a.

Further, an EGR amount sensor 25 is disposed in the EGR passage 9a. The EGR amount sensor 25 detects the EGR amount QEGR flowing through the EGR passage 9a, and delivers a signal indicative of the sensed EGR amount QEGR to the ECU 2.

The engine 3 is provided with a crank angle sensor 26. The crank angle sensor 26 is formed by a magnet rotor 26a and an MRE pickup 26b, and delivers a CRK signal and a TDC signal, which are both pulse signals, to the ECU 2 along with rotation of a crankshaft 3d.

The CRK signal is delivered whenever the crankshaft 3d rotates through a predetermined angle (e.g. 1 degree). The ECU 2 calculates a rotational speed NE of the engine 3 (hereinafter referred to as "the engine speed NE") based on the CRK signal. The TDC signal indicates that each piston in the associated cylinder 3a is in a predetermined crank angle position slightly before the TDC position at the start of the intake stroke, and in the case of the four-cylinder engine of the present embodiment, a pulse thereof is delivered whenever the crankshaft 3d rotates through 180 degrees.

Further, the engine 3 is provided with a cylinder discrimination sensor (not shown). The cylinder discrimination sensor delivers a cylinder discrimination signal which is a pulse signal for discriminating each cylinder 3a to the ECU 2. The ECU 2 calculates a crank angle CA for each cylinder 3a, based on the cylinder discrimination signal, the CRK signal, and the TDC signal. Specifically, the crank angle CA is reset to 0 when the TDC signal is generated, and is incremented whenever the CRK signal is generated, which is delivered whenever the crankshaft 3d rotates through 1 degree.

The body of the engine 3 is provided with a coolant temperature sensor 27. The coolant temperature sensor 27 detects a temperature TW of engine coolant (hereinafter referred to as "the engine coolant temperature TW") circulating through a cylinder block (not shown) of the engine 3, and delivers a signal indicative of the sensed engine coolant temperature TW to the ECU 2.

The aforementioned catalyst 10 is disposed in the exhaust passage 6 at a location downstream of the turbine blade 7b. The catalyst 10 is implemented by e.g. an oxidation catalyst which is maintained in an activated state when the temperature thereof is higher than a predetermined activation temperature TCATREF, and thereby purifies exhaust gases by oxidizing HC and CO in the exhaust gases flowing through the exhaust passage 6.

Further, an pre-catalyst exhaust gas temperature sensor 28 and a post-catalyst exhaust gas temperature sensor 29 are provided in the exhaust passage 6. The pre-catalyst exhaust gas temperature sensor 28 detects temperature TCATB of exhaust gases immediately upstream of the catalyst 10 (hereinafter referred to as "the pre-catalyst exhaust gas temperature TCATB"), and delivers a signal indicative of the sensed pre-catalyst exhaust gas temperature TCATB to the ECU 2. The post-catalyst exhaust gas temperature sensor 29 detects temperature TCATA of exhaust gases immediately downstream of the catalyst 10 (hereinafter referred to as "the post-catalyst exhaust gas temperature TCATA"), and delivers a signal indicative of the sensed post-catalyst exhaust gas temperature TCATA to the ECU 2.

Further, an accelerator pedal opening sensor 30 detects a stepped-on amount AP of an accelerator pedal (not shown) of the vehicle (hereinafter referred to as "the accelerator pedal opening AP"), delivers a signal indicative of the sensed accelerator pedal opening AP to the ECU 2, and a fuel pressure sensor 31 detects a pressure PF of the fuel injected by the injector 4 (hereinafter referred to as "the fuel pressure PF"), and delivers a signal indicative of the sensed fuel pressure PF to the ECU 2, respectively.

The ECU 2 is implemented by a microcomputer comprised of a CPU, a RAM, a ROM, and an I/O interface (none of which are specifically shown). The ECU 2 determines operating conditions of the engine 3 based on the detection signals from the aforementioned sensors 21 to 31, and carries out a fuel injection control process for controlling fuel injection including the aforementioned single injection and multi-injection based on the determined operating conditions. It should be noted that this fuel injection control is carried out for each cylinder 3a based on the cylinder discrimination signal, and hence for convenience's sake, the following description will be given of one of the cylinders 3a.

The fuel injection timing and the fuel injection amount for the single injection are calculated by searching respective predetermined maps (neither of which is shown) according to the engine speed NE and demanded torque PMCMD. The demanded torque PMCMD is calculated by searching a predetermined map (not shown) according to the engine speed NE and the accelerator pedal opening AP.

It should be noted that in the present embodiment, the ECU 2 corresponds to temperature acquisition means, activated state-determining means, target exhaust gas temperature-setting means, fuel supply means, and control means.

Figure 3:
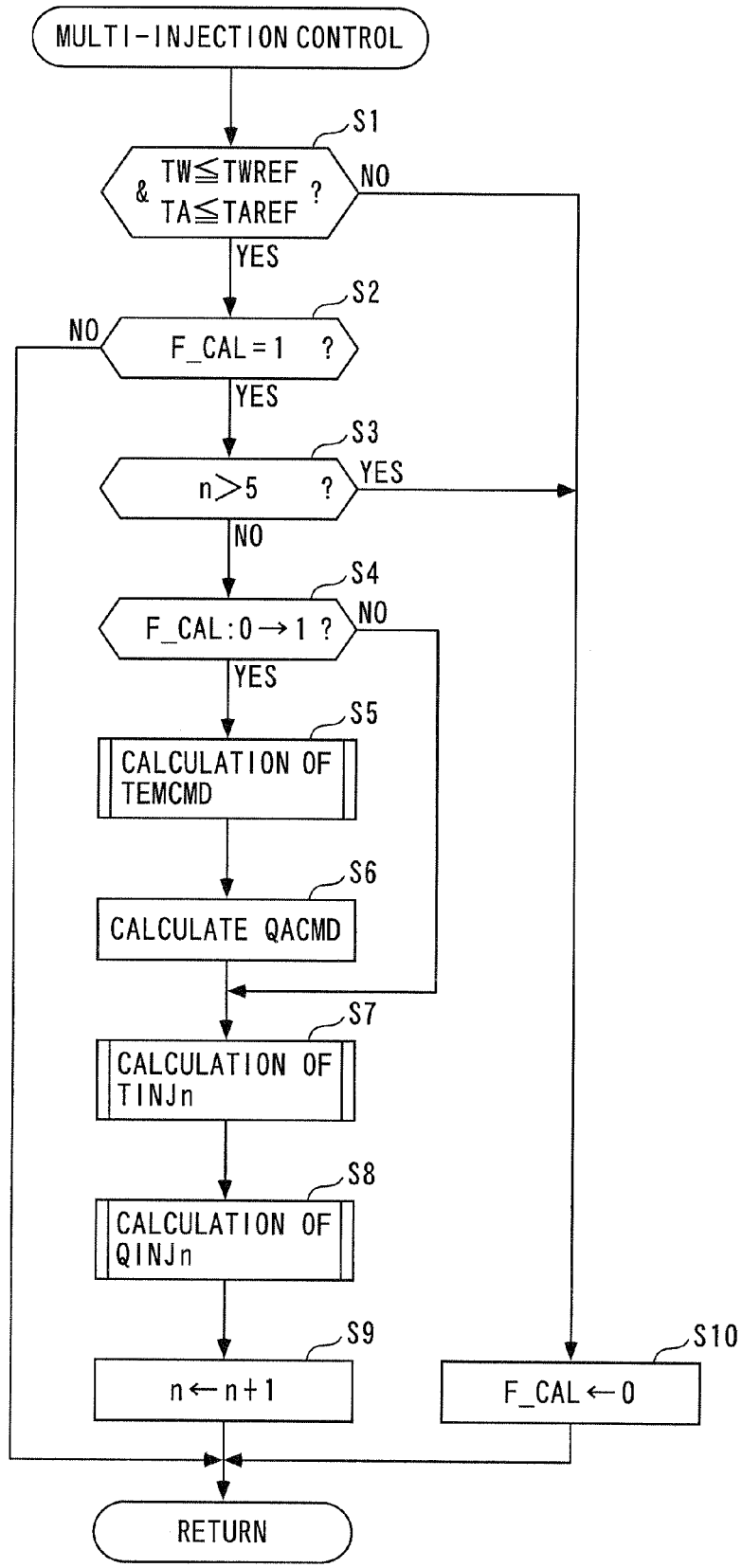
FIG. 3 is a main routine of a multi-injection control process executed by the temperature control device according to the first embodiment.

FIG. 3 is a flowchart of a multi-injection control process executed by the temperature control device according to the first embodiment of the present invention, for controlling the multi-injection. The present process is executed at a predetermined period which is shorter than the time interval of generation of TDC signals. It should be noted that in the following description, the first to fifth fuel injection timings for the multi-injection are set to first to fifth fuel injection timings TINJ1 to TINJ5, the fuel injection amounts injected by the first to fifth fuel injections are set to first to fifth fuel injection amounts QINJ1 to QINJ5, and these first to fifth fuel injection timings TINJ1 to TINJ5 and the first to fifth fuel injection amounts QINJ1 to QINJ5 are accordingly referred to as the fuel injection timing TINJn and the fuel injection amount QINJn. The suffix n appended to both values represents the order of fuel injection (what number injection (n=1 to 5)) performed for the multi-injection.

In the present process, first, in a step 1 (shown as S1 in abbreviated form in FIG. 3; the following steps are also shown in abbreviated form), it is determined whether or not the engine coolant temperature TW is lower than a predetermined temperature TWREF, and at the same time the intake air temperature TA is lower than a predetermined temperature TAREF. If the answer to this question is affirmative (YES), it is determined that the engine 3 is in cold operation, so that it is determined whether or not a calculation in-process flag F_CAL is equal to 1, indicating that the fuel injection timing TINJn and the fuel injection amount QINJn by the multi-injection are being calculated (step 2). This calculation in-process flag F_CAL is set to 1 in synchronism with generation of the TDC signal. Further, in synchronism with generation of the TDC signal, the injection order n is initialized to 1.

If the answer to the question of the step 2 is affirmative (YES), it is determined whether or not the injection order n is larger than 5 (step 3). If the answer to this question is negative (NO), it is determined whether or not the calculation in-process flag F_CAL has been changed from 0 to 1 between the immediately preceding value and the current value (step 4).

If the answer to this question is affirmative (YES), i.e. if the process proceeds to a first loop in which the calculation in-process flag F_CAL has been set to 1, a target exhaust gas temperature TEMCMD is calculated (step 5).

Figure 4:
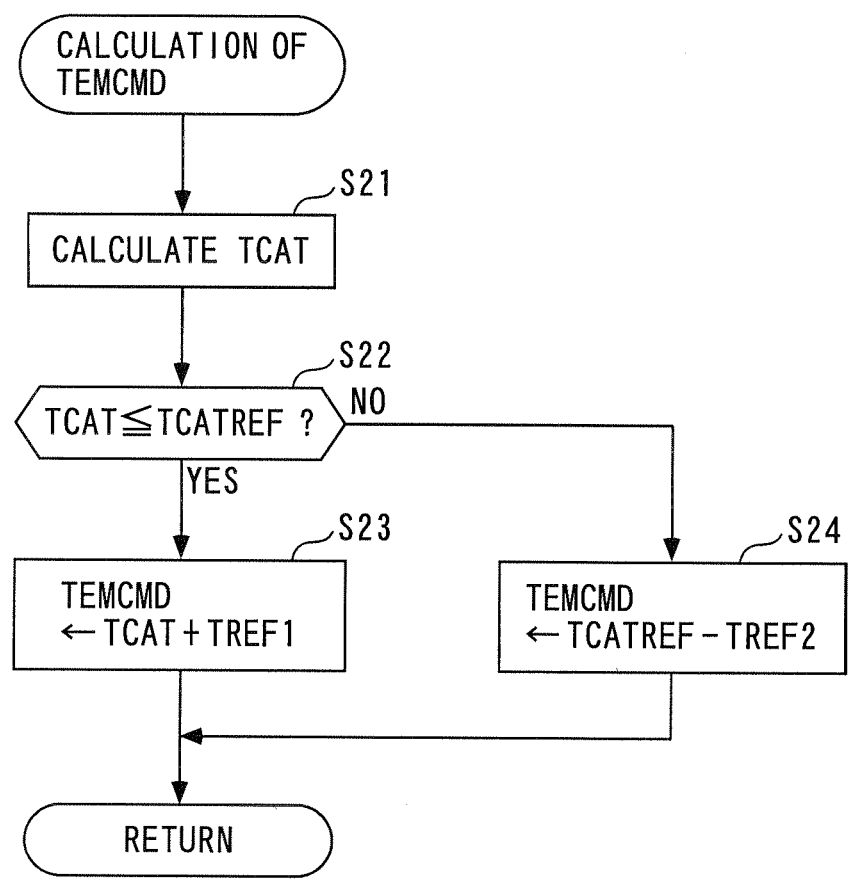
FIG. 4 is a subroutine for a process for calculating a target exhaust gas temperature.

FIG. 4 is a subroutine for a process for calculating the target exhaust gas temperature TEMCMD. In the present process, first, in a step 21, a temperature TCAT of the catalyst 10 (hereinafter referred to as "the catalyst temperature TCAT") is estimated based on the pre-catalyst exhaust gas temperature TCATB and the post-catalyst exhaust gas temperature TCATA which are detected by the pre-catalyst exhaust gas temperature sensor 28 and the post-catalyst exhaust gas temperature sensor 29, respectively. Specifically, the catalyst temperature TCAT is calculated by weighted average of the pre-catalyst exhaust gas temperature TCATB and the post-catalyst exhaust gas temperature TCATA.

Next, it is determined whether or not the calculated catalyst temperature TCAT is not higher than the activation temperature TCATREF (step 22). If the answer to this question is affirmative (YES), i.e. if the catalyst temperature TCAT is not higher than the activation temperature TCATREF, it is determined that the catalyst 10 is not in the activated state, so that a value obtained by adding a first predetermined temperature TREF1 (e.g. 20° C.) to the catalyst temperature TCAT is set as the target exhaust gas temperature TEMCMD (step 23), followed by terminating the present process.

On the other hand, if the answer to the question of the step 22 is negative (NO), i.e. if the catalyst temperature TCAT is higher than the activation temperature TCATREF, it is determined that the catalyst 10 is in the activated state, so that a value obtained by subtracting a second predetermined temperature TREF2 (e.g. 10° C.) from the activation temperature TCATREF is set as the target exhaust gas temperature TEMCMD (step 24), followed by terminating the present process.

Referring again to FIG. 3, in a step 6 following the step 5, a target intake air amount QACMD is calculated by searching a predetermined map (not shown) according to the calculated target exhaust gas temperature TEMCMD. The TH actuator 8b is controlled such that the detected intake air amount QA becomes equal to the target intake air amount QACMD, whereby the intake air amount QA is feedback-controlled such that it converges to the target intake air amount QACMD.

Then, the fuel injection timing TINJn with respect to the injection order n is calculated (step 7), and the fuel injection amount QINJn is calculated (step 8). These calculation processes will be described hereinafter. It should be noted that the fuel injection timing TINJn is represented by a crank angle CA to be detected when the fuel is injected. As described above, similarly to the calculation in-process flag F_CAL, since the injection order n is reset to 1 in synchronism with generation of the TDC signal, if the answer to the question of the step 4 is affirmative (YES), the injection order n becomes equal to 1, and accordingly, in the steps 7 and 8, as the fuel injection timing TINJn and the fuel injection amount QINJn, the first fuel injection timing TINJ1 and the first fuel injection amount QINJ1 are calculated, respectively.

Then, the injection order n is incremented (step 9), followed by terminating the present process. By executing the step 9, the injection order n becomes equal to 2 in the next loop, and hence the answer to the question of the step 4 becomes negative (NO). In this case, the steps 5 and 6 are skipped, and the process proceeds to the step 7, wherein as the fuel injection timing TINJn and the fuel injection amount QINJn, the second fuel injection timing TINJ2 and the second fuel injection amount QINJ2 are calculated, respectively. Thereafter, the step 9 is executed, followed by terminating the present process.

Thereafter, by repeatedly executing the steps 7 and 8, the third to fifth fuel injection timings TINJ3 to TINJ5 and the third to fifth fuel injection amounts QINJ3 to QINJ5 are sequentially calculated. Further, immediately after calculating the fifth fuel injection timing TINJ5 and the fifth fuel injection amount QINJ5, by executing the step 9, the injection order n becomes larger than 5, so the answer to the question of the step 3 becomes affirmative (YES). In this case, it is determined that calculations of all of the first to fifth fuel injection timings TINJ1 to TINJ5 and the first to fifth fuel injection amounts QINJ1 to QINJ5 are completed, so that the calculation in-process flag F_CAL is reset to 0 (step 10), followed by terminating the present process. By executing the step 10, the answer to the question of the step 2 is negative (NO), and in this case, the present process is immediately terminated.

On the other hand, if the answer to the question of the step 1 is negative (NO), i.e. if the engine coolant temperature TW is higher than the predetermined temperature TWREF, or if the intake air temperature TA is higher than the predetermined temperature TAREF, it is determined that the engine coolant temperature TW and the intake air temperature TA are relatively high, so that the engine 3 is not in cold operation, so that the step 10 is executed, followed by terminating the present process.

By controlling the valve-opening timing and the valve-opening time period of the injector 4 based on the first to fifth fuel injection timings TINJ1 to TINJ5 and the first to fifth fuel injection amounts QINJ1 to QINJ5 calculated as above, five divided injections for the multi-injection are carried out.

Figure 5:
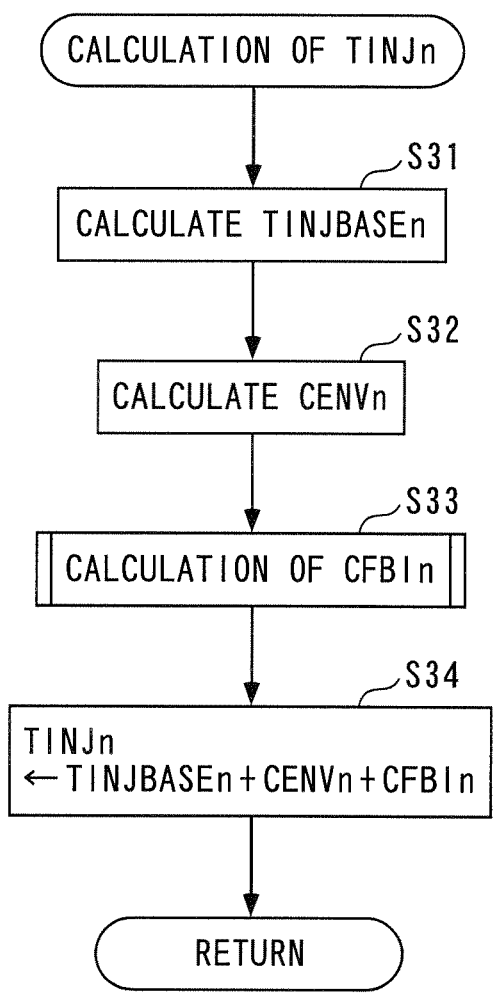
FIG. 5 is a subroutine for a process for calculating a fuel injection timing.

FIG. 5 is a subroutine for a process for calculating the fuel injection timing TINJn, executed in the step 7. It should be noted that the methods of calculating the first to fifth fuel injection timings TINJ1 to TINJ5 are basically the same, and hence the following description will be mainly given of a case of the injection order n=1, i.e. the first fuel injection timing TINJ1.

In the present process, first, in a step 31, a base value TINJBASEn of the fuel injection timing is calculated. Specifically, a first base value TINJBASE1 of the fuel injection timing is calculated by searching a predetermined first fuel injection timing map (not shown) according to the engine speed NE, the demanded torque PMCMD, the target intake air amount QACMD, and the target exhaust gas temperature TEMCMD calculated in the step 23 or 24. In the first fuel injection timing map, the first base value TINJBASE1 is set in the vicinity of the start of the expansion stroke to ensure excellent ignition performance of the fuel, and more specifically, as the target intake air amount QACMD is less, the first base value TINJBASE1 is set to be more advanced. Further, as the engine speed NE is lower, and as the demanded torque PMCMD is lower, the first base value TINJBASE1 is set to be more retarded to raise the temperature of the exhaust gases in the lower temperature.

Next, a first environmental correction value CENV1 is calculated (step 32). The calculation of an environmental correction value CENVn is performed by searching respective predetermined associated maps (not shown) according to the intake air temperature TA, the intake air pressure PB, the EGR amount QEGR, the fuel pressure PF, a fuel property, the warming-up condition of the engine 3, and the energized state of the glow plug 11, and so forth, to calculate respective correction values, and adding up these correction values. It should be noted that the above-mentioned fuel property is calculated e.g. according to the actual combustion start timing and the target combustion start timing of fuel for the single injection, and the warming-up condition of the engine 3 is determined e.g. according to the wall temperature of the cylinders 3a estimated e.g. by the integrated value of the fuel injection amount from the start of the engine 3.

Then, a first feedback correction value CFBI1 is calculated as described hereinafter (step 33). Then, the first fuel injection timing TINJ1 is calculated by adding the first environmental correction value CENV1 and the first feedback correction value CFBI1 to the calculated first base value TINJBASE1 (step 34), followed by terminating the present process.

Further, in the case of the injection order n=2, similarly to the case of the first fuel injection timing TINJ1, in the steps 31 to 34, the second fuel injection timing TINJ2 is calculated. Specifically, in the step 31, a second base value TINJBASE2 of the fuel injection timing is calculated by searching a predetermined second fuel injection timing map (not shown) according to the engine speed NE, the demanded torque PMCMD, the target intake air amount QACMD, and the target exhaust gas temperature TEMCMD. Next, a second environmental correction value CENV2 is calculated according to the intake air temperature TA, the intake air pressure PB, the EGR amount QEGR, the fuel pressure PF, the fuel property, and so forth, and a second feedback correction value CFBI2 is calculated (steps 32 and 33). Then, the second fuel injection timing TINJ2 is calculated by adding the second environmental correction value CENV2 and the second feedback correction value CFBI2 to the second base value TINJBASE2, (step 34).

Similarly, in the cases of the injection order n=3 to 5, the third to fifth base values TINJBASE3 to TINJBASE5 of the fuel injection timing are calculated by searching predetermined third to fifth fuel injection timing maps (not shown) according to the engine speed NE, and so forth, respectively (step 31).

Next, the third to fifth fuel injection timings TINJ3 to TINJ5 are calculated by adding the third to fifth environmental correction values CENV3 to CENV5 calculated in the step 32 and the third to fifth feedback correction values CFBI3 to CFBI5 calculated in the step 33 to the calculated third to fifth base values TINJBASE3 to TINJBASE5, respectively, (step 34).

It should be noted that in these first to fifth fuel injection timing maps, the first to fifth base values TINJBASE1 to TINJBASE5 are set such that the combustion is continuously performed from the start of a first combustion time period until the termination of a fifth combustion time period, referred to hereinafter (see FIG. 12). Further, the first to fifth base values TINJBASE1 to TINJBASE5 are set such that as the target exhaust gas temperature TEMCMD is higher, each length of the first to fifth combustion time periods is set to be longer. This is because as the first to fifth combustion time periods are longer, the entire combustion time period in one combustion cycle becomes longer, which makes it possible to make the exhaust gas temperature higher.

Figure 6:
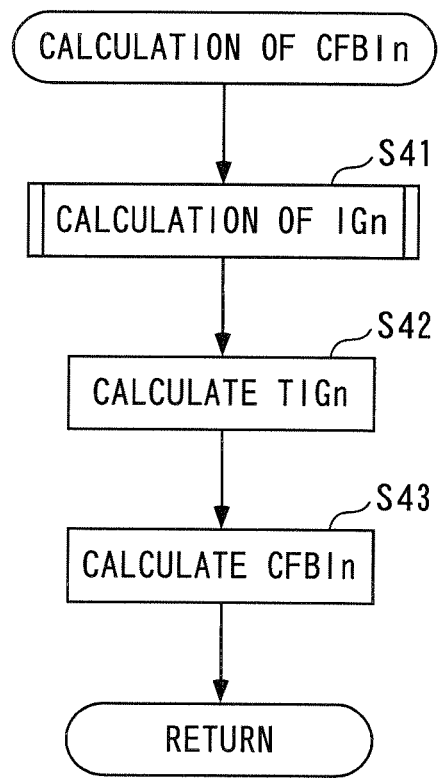
FIG. 6 is a subroutine for a process for calculating a feedback correction value of the fuel injection timing.

FIG. 6 is a subroutine for a process for calculating the feedback correction value CFBIn executed in the step 33. It should be noted that the methods of calculating the first to fifth feedback correction values CFBI1 to CFBI5 are basically the same, and hence the following description will be mainly given of a case of the injection order n=1, i.e. the first feedback correction value CFBI1.

In the present process, first, in a step 41, timing at which the combustion of the fuel injected by the first fuel injection is actually started is calculated as a first actual combustion timing IG1. This calculation process will be described hereinafter.

Next, a first target combustion timing TIG1 as a target of the first actual combustion timing IG1 is calculated by searching a predetermined map (not shown) according to the target exhaust gas temperature TEMCMD and the demanded torque PMCMD (step 42).

Then, the first feedback correction value CFBI1 of the fuel injection timing is calculated according to the calculated first actual combustion timing IG1 and the first target combustion timing TIG1 (step 43), followed by terminating the present process. The calculation of the first feedback correction value CFBI1 is performed by e.g. PID feedback control such that the first actual combustion timing IG1 converges to the first target combustion timing TIG1.

In the following cases of the injection order n=2 to 5, similarly to the case of the first feedback correction value CFBI1, second to fifth actual combustion timings IG2 to IG5 are calculated (step 41), and second to fifth target combustion timings TIG2 to TIG5 are calculated by searching respective predetermined maps according to the target exhaust gas temperature TEMCMD and so forth (step 42). Then, the second to fifth feedback correction values CFBI2 to CFBI5 are calculated according to the second to fifth actual combustion timings IG2 to IG5 and the second to fifth target combustion timings TIG2 to TIG5, respectively (step 43).

Figure 7:
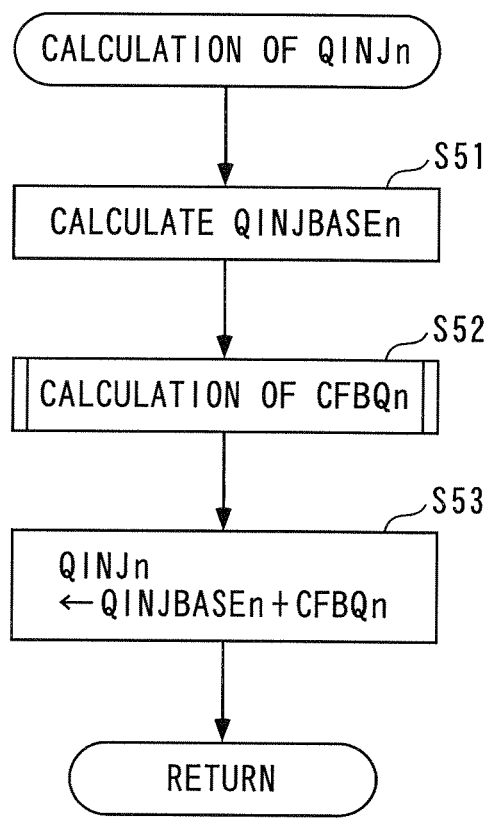
FIG. 7 is a subroutine for a process for calculating a fuel injection amount.

FIG. 7 is a subroutine for the process for calculating the fuel injection amount QINJn, which is executed in the step 8. It should be noted that the methods of calculating the first to fifth fuel injection amounts QINJ1 to QINJ5 are basically the same, and hence the following description will be mainly given of a case of the injection order n=1, i.e. the first fuel injection amount QINJ1.

In the present process, first, in a step 51, a first base value QINJBASE1 of the fuel injection amount is calculated by searching a predetermined first fuel injection amount map (not shown) according to the engine speed NE, the demanded torque PMCMD, the target exhaust gas temperature TEMCMD, and the first fuel injection timing TINJ1.

Next, a first feedback correction value CFBQ1 is calculated as described hereinafter (step 52). Then, the first fuel injection amount QINJ1 is calculated by adding the first feedback correction value CFBQ1 to the calculated first base value QINJBASE1 (step 53), followed by terminating the present process.

Also in the following cases of the injection order n=2 to 5, similarly to the case of the first fuel injection amount QINJ1, second to fifth base values QINJBASE2 to QINJBASE5 of the fuel injection amount are calculated (step 51) by searching respective predetermined second to fifth fuel injection amount maps (none of which are shown) according to the second to fifth fuel injection timings TINJ2 to TINF5, and the second to fifth fuel injection amounts QINJ2 to QINJ5 are calculated by adding the second to fifth feedback correction values CFBQ2 to CFBQ5 which are calculated in the step 52 to the second to fifth base values QINJBASE2 to QINJBASE5, respectively (step 53). It should be noted that in the above-mentioned first to fifth fuel injection amount maps, as the target exhaust gas temperature TEMCMD is higher, the first to fifth base values QINJBASE1 to QINJBASE5 are set to larger values.

Figure 8:
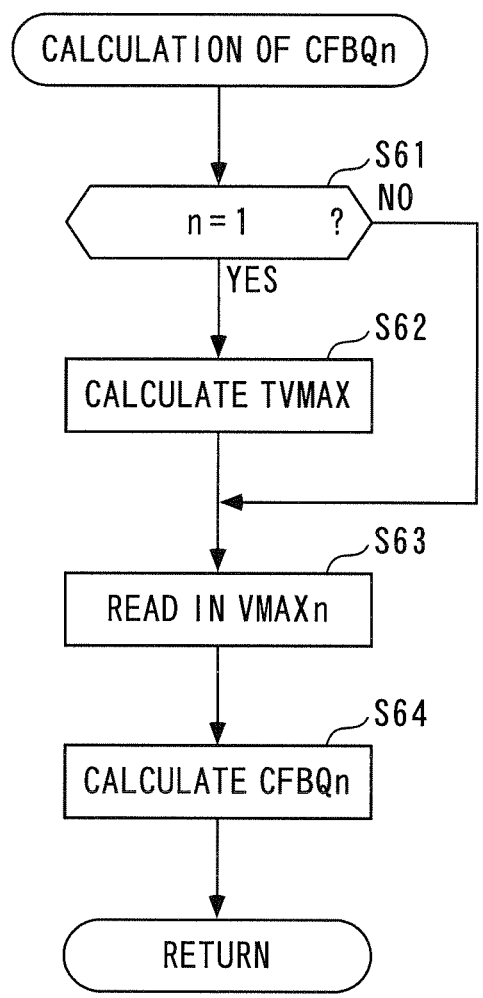
FIG. 8 is a subroutine for a process for calculating a feedback correction value of the fuel injection amount.

FIG. 8 is a subroutine for a process for calculating the feedback correction value CFBQn executed in the step 52. In the present process, first, in a step 61, it is determined whether or not the injection order n is equal to 1. If the answer to this question is affirmative (YES), a target maximum combustion speed TVMAX is calculated by searching a predetermined map (not shown) according to the target exhaust gas temperature TEMCMD and the demanded torque PMCMD (step 62).

Next, a first maximum combustion speed VMAX1 in the first combustion time period is read in (step 63). The first maximum combustion speed VMAX1 is calculated together with the actual combustion timing IGn in a subroutine for calculating the actual combustion timing IGn, referred to hereinafter. Then, the first feedback correction value CFBQ1 of the fuel injection amount is calculated according to the calculated target maximum combustion speed TVMAX and the first maximum combustion speed VMAX1 (step 64), followed by terminating the present process. The calculation of the feedback correction value CFBQn is performed by e.g. PID feedback control such that the first maximum combustion speed VMAX1 converges to the target maximum combustion speed TVMAX.

On the other hand, if the answer to the question of the step 61 is negative (NO), i.e. if the injection order n equals to any of 2 to 5, the step 62 is skipped, and by executing the step 63 et seq., the second to fifth feedback correction values CFBQ2 to CFBQ5 are calculated, respectively.

Specifically, similarly to the case of the first feedback correction value CFBQ1, the currently associated one of second to fifth maximum combustion speeds VMAX2 to VMAX5 during the respective second to fifth combustion time periods is read in (step 63), and according to the read-in one of the second to fifth maximum combustion speeds VMAX2 to VMAX5 and the target maximum combustion speed TVMAX calculated in the step 62, an associated one of the second to fifth feedback correction values CFBQ2 to CFBQ5 is calculated (step 64).

Figure 9:
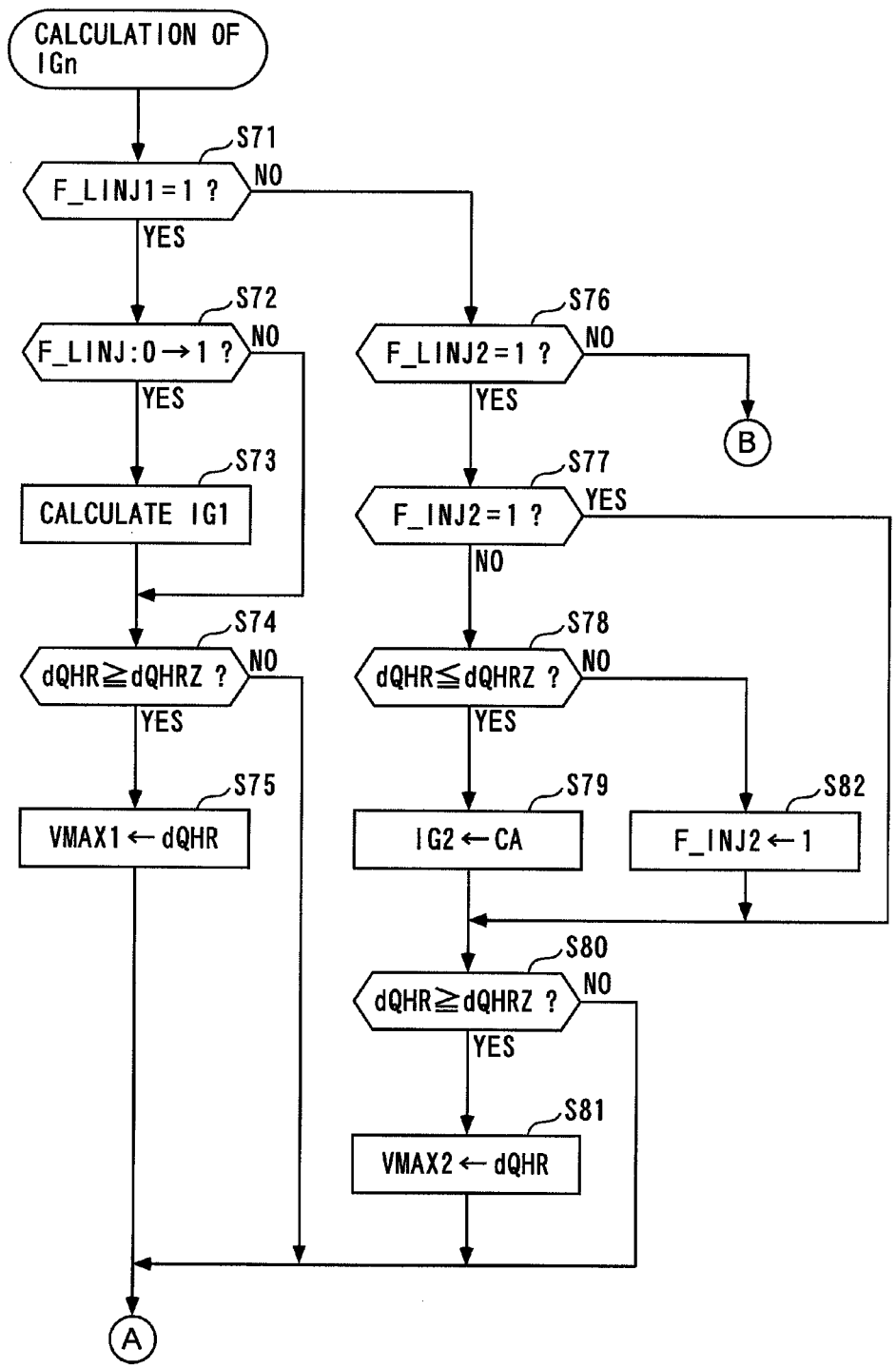
FIG. 9 is a subroutine of part of a process for calculating an actual combustion timing.
Figure 10:
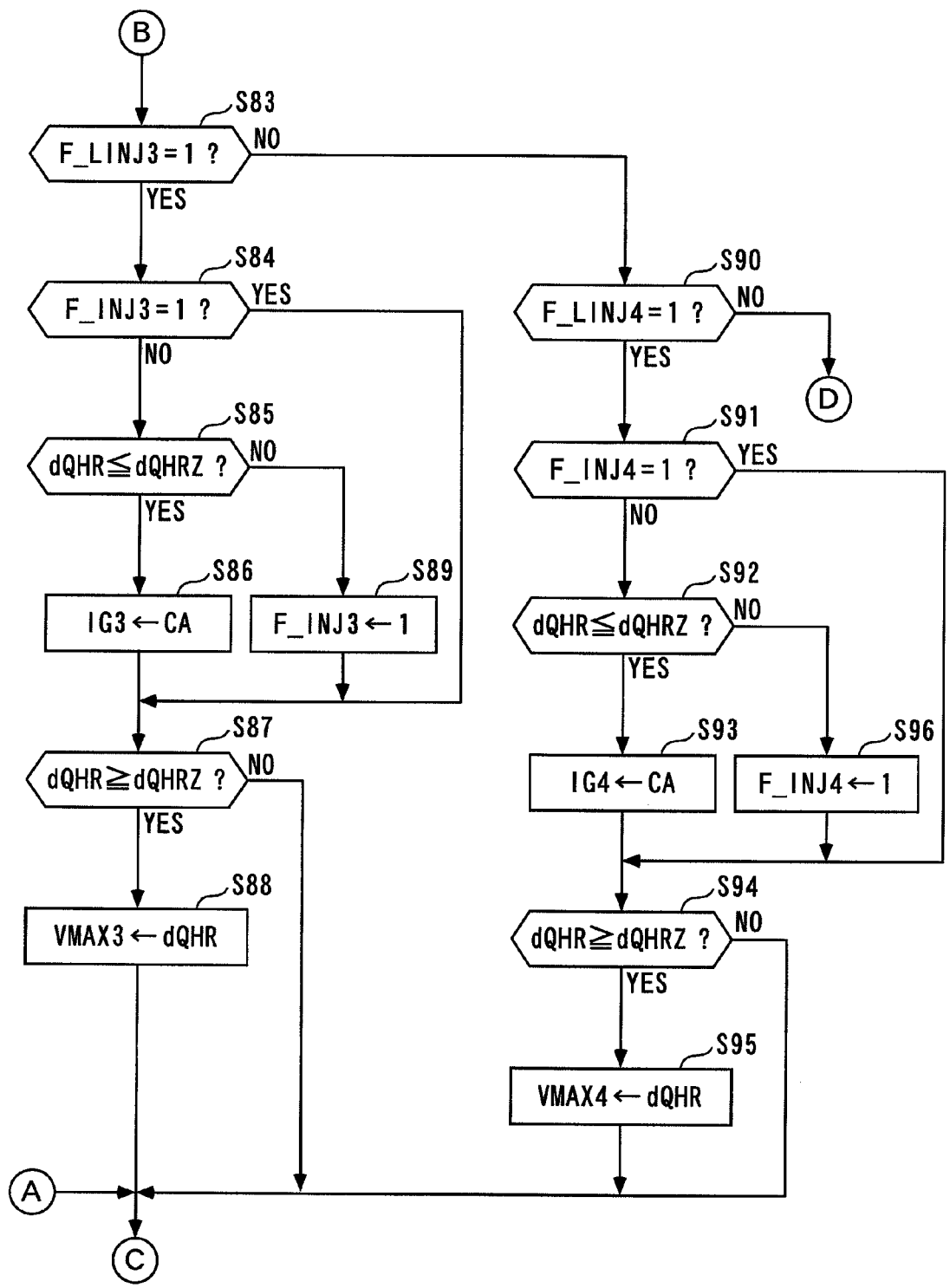
FIG. 10 is a continuation of FIG. 9.
Figure 11:
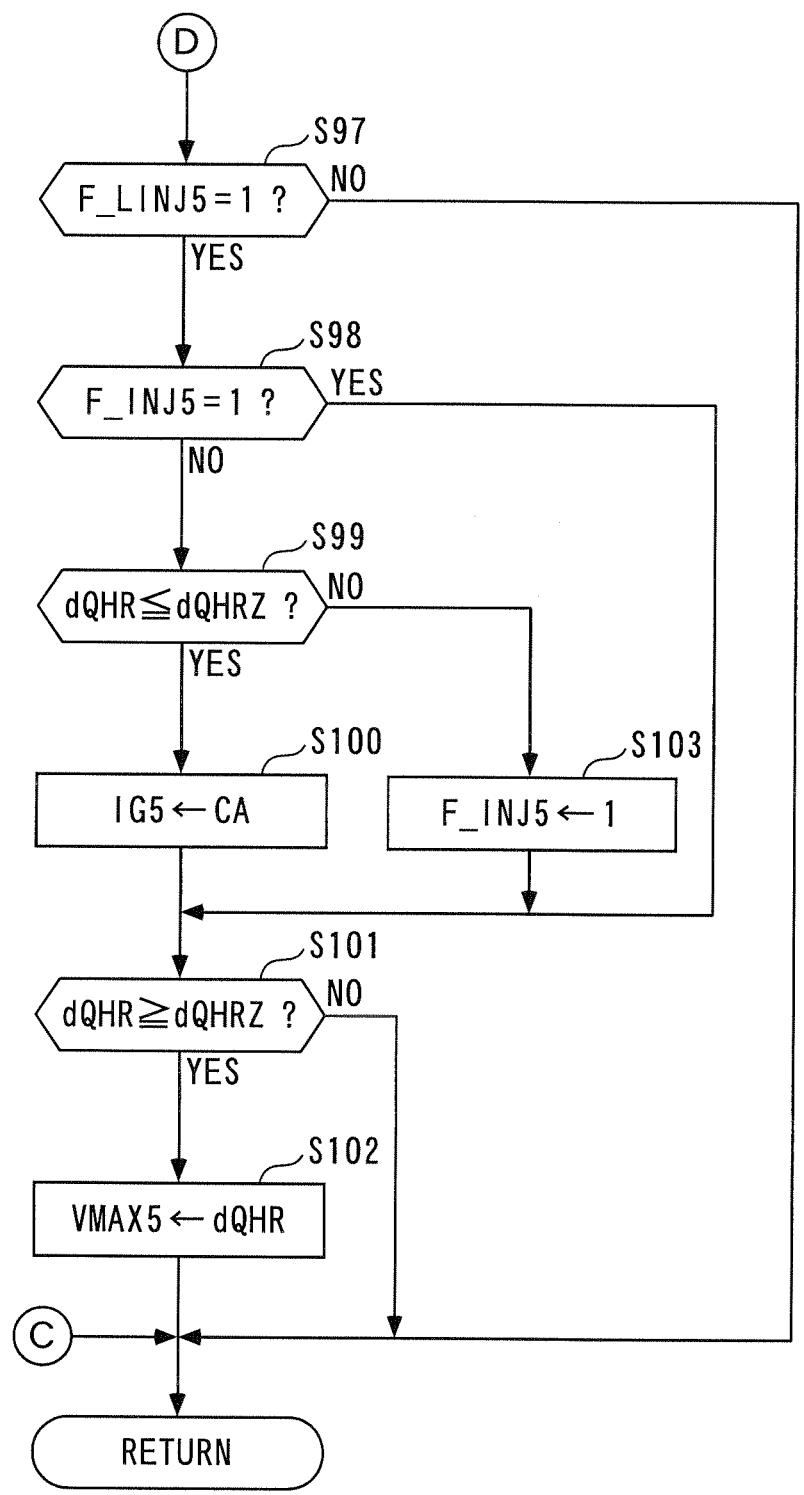
FIG. 11 is a continuation of FIG. 10.

FIGS. 9 to 11 are a subroutine for the process for calculating the actual combustion timing IGn, which is executed in the step 41. The present process is executed for calculating the actual combustion timing IGn together with the maximum combustion speed VMAXn, during each of the first to fifth combustion time periods. Further, as shown in FIG. 12, these first to fifth combustion time periods are defined as a time period between the first and the second fuel injection timings TINJ1 and TINJ2, a time period between the second and the third fuel injection timings TINJ2 and TINJ3, a time period between the third and the fourth fuel injection timings TINJ3 and TINJ4, a time period between the fourth and the fifth fuel injection timings TINJ4 and TINJ5, and a time period between the fifth fuel injection timing TINJ5 and a predetermined crank angle CAREF, respectively.

In the present process, first, in a step 71, it is determined whether or not a first combustion time period flag F_LINJ1 is equal to 1. The first combustion time period flag F_LINJ1 is set to be equal to 1 during the first combustion time period. If the answer to the question of the step 71 is affirmative (YES), i.e. if the present time is within the first combustion time period, it is determined whether or not the first combustion time period flag F_LINJ1 has been changed from 0 to 1 between the immediately preceding loop and the current loop (step 72). If the answer to this question is affirmative (YES), i.e. if it is immediately after the start of the first fuel injection, timing at which a heat release rate dQHR, referred to hereinafter, starts to rise is detected, and the detected timing is calculated as the first actual combustion timing IG1 (step 73), and then, the process proceeds to a step 74.

On the other hand, if the answer to the question of the step 72 is negative (NO), the step 73 is skipped, and the process proceeds to the step 74.

In the step 74, it is determined whether or not the heat release rate dQHR is not less than the immediately preceding value dQHRZ. The heat release rate dQHR is an amount of heat release per unit crank angle, and is calculated using the in-cylinder pressure PCYL detected by the in-cylinder pressure sensor 21 by the following equation (1):

$$dQHR = (\kappa \times PCYL \times 1000 \times dV\theta + dPCYL \times 1000 \times v\theta)/(\kappa - 1) \quad (1)$$

wherein
dQHR: heat release rate
$\kappa$: specific heat ratio of a mixture
PCYL: in-cylinder pressure
$dV\theta$: in-cylinder capacity change rate
dPCYL: in-cylinder pressure change rate
$V\theta$: in-cylinder capacity Here, the specific heat ratio $\kappa$ is set to a predetermined value (e.g. 1.34). Further, both of the in-cylinder capacity change rate $dV\theta$ and the in-cylinder capacity $V\theta$ are calculated based on the crank angle CA.

If the answer to the question of the step 74 is affirmative (YES), i.e. if dQHR$\geq$dQHRZ holds, the heat release rate dQHR at the time is set as the first maximum combustion speed VMAX1 (step 75), followed by terminating the present process.

On the other hand, if the answer to the question of the step 74 is negative (NO), i.e. if dQHR<dQHRZ holds, the present process is immediately terminated. As described above, insofar as the heat release rate dQHR is not less than the immediately preceding value dQHRZ, the first maximum combustion speed VMAX1 is updated, and hence the first maximum combustion speed VMAX1 corresponds to the maximum value of the heat release rate dQHR in the first combustion time period (see FIG. 12).

On the other hand, if the answer to the question of the step 71 is negative (NO), i.e. if the present time is not within the first combustion time period, it is determined whether or not a second combustion time period flag F_LINJ2 is equal to 1 (step 76). The second combustion time period flag F_LINJ2 is set to be equal to 1 during the second combustion time period. If the answer to the question of the step 76 is affirmative (YES), i.e. if the present time is within the second combustion time period, it is determined whether or not a second combustion start flag F_INJ2 is equal to 1 (step 77). The second combustion start flag F_INJ2, and third to fifth combustion start flags F_INJ3 to F_INJ5, referred to hereinafter, indicate that the combustion has just started within the respective second to fifth combustion time periods, and are reset to 0 in synchronism with the generation of the TDC signal.

If the answer to the question of the step 77 is negative (NO), it is determined whether or not the heat release rate dQHR is not more than the immediately preceding value dQHRZ (step 78). If the answer to this question is affirmative (YES), i.e. if the heat release rate dQHR has lowered, the crank angle CA at the time is set as the second actual combustion timing IG2 (step 79), and then, the process proceeds to a step 80.

On the other hand, if the answer to the question of the step 78 is negative (NO), i.e. if the heat release rate dQHR is larger than the immediately preceding value dQHRZ, and hence has started to rise, it is determined that the combustion of the fuel injected by the second fuel injection has been started, so that the second combustion start flag F_INJ2 is set to 1 (step 82), and then, the process proceeds to the step 80.

By executing the step 82, the answer to the question of the step 77 is affirmative (YES), and in this case, the process immediately proceeds to the step 80.

In the step 80, it is determined whether or not the heat release rate dQHR is not less than the immediately preceding value dQHRZ. If the answer to this question is affirmative (YES), the heat release rate dQHR at the time is set as the second maximum combustion speed VMAX2 (step 81), followed by terminating the present process. On the other hand, if the answer to the question of the step 80 is negative (NO), the present process is immediately terminated.

As described above, if the time is within the second combustion time period, within a time period until the second combustion start flag F_INJ2=1 is satisfied, i.e. within a time period after the second fuel injection is performed until the fuel starts to be burned, insofar as dQHR$\leq$dQHRZ is satisfied, the second actual combustion timing IG2 is updated. Therefore, as shown in FIG. 12, the second actual combustion timing IG2 corresponds to the crank angle CA assumed when the heat release rate dQHR indicates the minimum value before the fuel starts to be burned during the second combustion time period. Further, insofar as dQHR$\geq$dQHRZ is satisfied, the second maximum combustion speed VMAX2 is updated, and hence the second maximum combustion speed VMAX2 corresponds to the maximum value of the heat release rate dQHR in the second combustion time period.

On the other hand, if the answer to the question of the step 76 is negative (NO), i.e. if the present time is not within the second combustion time period, it is determined whether or not a third combustion time period flag F_LINJ3 is equal to 1 (step 83). The third combustion time period flag F_LINJ3 is set to be equal to 1 during the third combustion time period. If the answer to the question of the step 83 is affirmative (YES), i.e. if the combustion is performed within the third combustion time period, by executing the same processes as in the steps 77 to 82, in steps 84 to 89 for the third combustion time period, the third actual combustion timing IG3 and the third maximum combustion speed VMAX3 are calculated.

Specifically, first, in the step 84, it is determined whether or not the third combustion start flag F_INJ3 is equal to 1. If the answer to this question is negative (NO), it is determined that the combustion of the fuel injected by the third fuel injection has not been started, so that it is determined whether or not the heat release rate dQHR is not more than the immediately preceding value dQHRZ (step 85). If the answer to this question is affirmative (YES), the crank angle CA at the time is set as the third actual combustion timing IG3 (step 86), and then, the process proceeds to the step 87, whereas if the answer to the question of the step 85 is negative (NO), it is determined that the combustion of the fuel injected by the third fuel injection has been started, so that the third combustion start flag F_INJ3 is set to 1 (step 89), and then, the process proceeds to the step 87.

By executing the step 89, the answer to the question of the step 84 becomes affirmative (YES), and in that case, the process immediately proceeds to the step 87.

In the step 87, it is determined whether or not the heat release rate dQHR is not less than the immediately preceding value dQHRZ. If the answer to this question is affirmative (YES), the heat release rate dQHR at the time is set as the third maximum combustion speed VMAX3 (step 88), and then, the present process is terminated, whereas if the answer to the question of the step 87 is negative (NO), the present process is immediately terminated.

Figure 12:
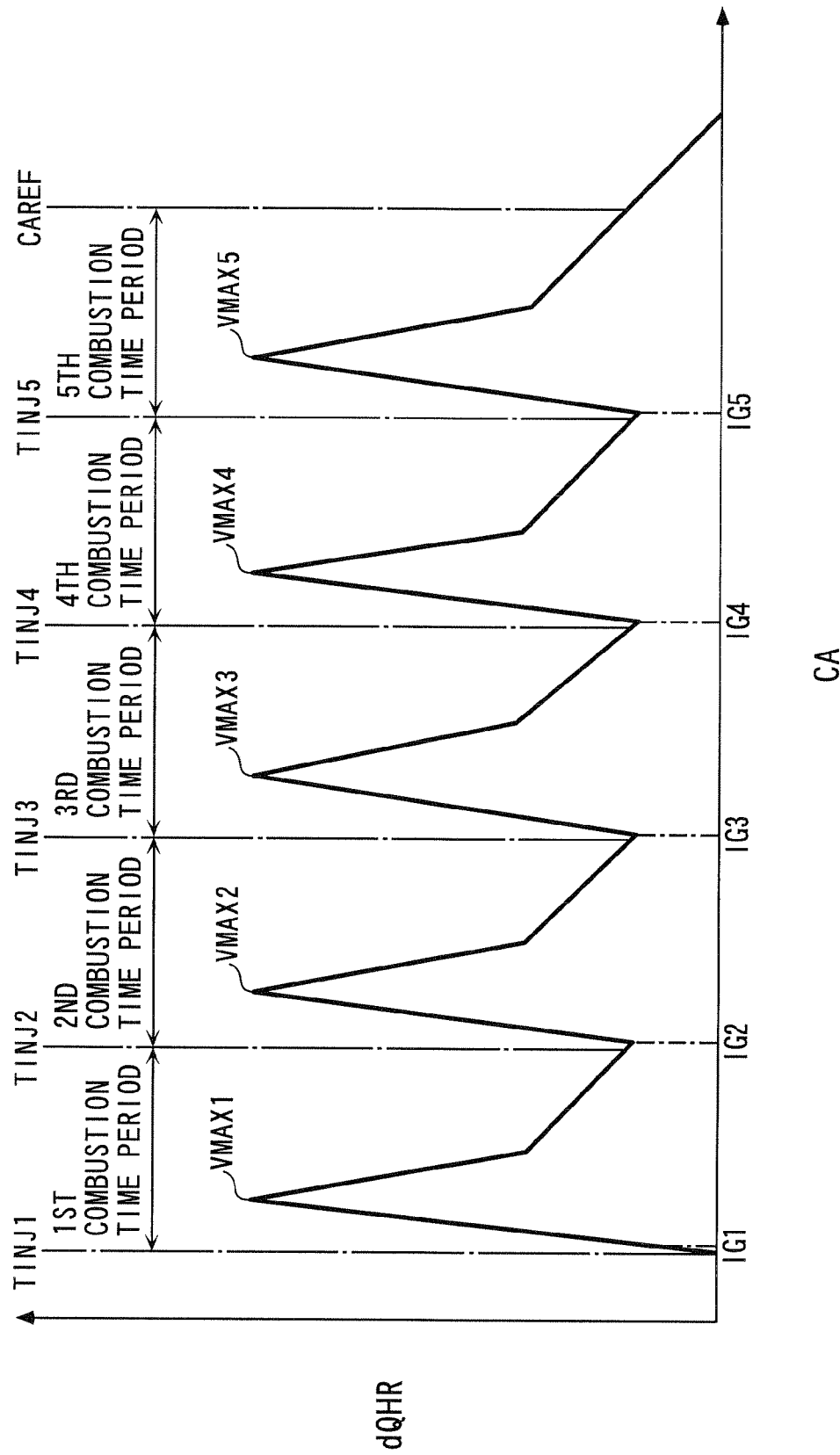
FIG. 12 is a diagram showing an example of maximum combustion speeds and actual combustion timings during first to fifth combustion time periods of combustion performed by multi-injection.

As described above, also in the third combustion time period, similarly to the case of the second combustion time period, within a time period after the third fuel injection is performed until the fuel starts to be burned, insofar as $dQHR \leqq dQHRZ$ is satisfied, the third actual combustion timing IG3 is updated, and hence, as shown in FIG. 12, the third actual combustion timing IG3 corresponds to the crank angle CA assumed when the heat release rate dQHR indicates the minimum value before the fuel starts to be burned during the third combustion time period. Further, insofar as $dQHR \geqq dQHRZ$ is satisfied, the third maximum combustion speed VMAX3 is updated, and hence the third maximum combustion speed VMAX3 corresponds to the maximum value of the heat release rate dQHR in the third combustion time period.

On the other hand, if the answer to the question of the step 83 is negative (NO), i.e. if the combustion is not performed within the third combustion time period, it is determined whether or not a fourth combustion time period flag F_LINJ4 is equal to 1 (step 90). The fourth combustion time period flag F_LINJ4 is set to be equal to 1 during the fourth combustion time period. If the answer to the question of the step 90 is affirmative (YES), i.e. if the combustion is performed within the fourth combustion time period, by executing the same processes as in the steps 77 to 82 and 84 to 89, in steps 91 to 96 for the fourth combustion time period, the fourth actual combustion timing IG4 and the fourth maximum combustion speed VMAX4 are calculated, followed by terminating the present process.

As described above, also in the fourth combustion time period, similarly to the cases of the second and third combustion time periods, the fourth actual combustion timing IG4 and the fourth maximum combustion speed VMAX4 are updated, whereby as shown in FIG. 12, the fourth actual combustion timing IG4 corresponds to the crank angle CA assumed when the heat release rate dQHR indicates the minimum value before the fuel starts to be burned during the fourth combustion time period, and the fourth maximum combustion speed VMAX4 corresponds to the maximum value of the heat release rate dQHR in the fourth combustion time period.

On the other hand, if the answer to the question of the step 90 is negative (NO), i.e. if the present time is not within the fourth combustion time period, it is determined whether or not a fifth combustion time period flag F_LINJ5 is equal to 1 (step 97). The fifth combustion time period flag F_LINJ5 is set to be equal to 1 during the fifth combustion time period. If the answer to the question of the step 97 is affirmative (YES), i.e. if the present time is within the fifth combustion time period, by executing the same processes as in the steps 77 to 82 and the like, in steps 98 to 103 for the fifth combustion time period, the fifth actual combustion timing IG5 and the fifth maximum combustion speed VMAX5 are calculated, followed by terminating the present process.

As described above, also in the fifth combustion time period, similarly to the cases of the second combustion time period and the like, as shown in FIG. 12, the fifth actual combustion timing IG5 corresponds to the crank angle CA assumed when the heat release rate dQHR indicates the minimum value before the fuel starts to be burned in the fifth combustion time period, and the fifth maximum combustion speed VMAX5 corresponds to the maximum value of the heat release rate dQHR in the fifth combustion time period.

On the other hand, if the answer to the question of the step 97 is negative (NO), i.e. if the present time is not within any of the first to fifth combustion time periods, the present process is immediately terminated.

By calculating the first to fifth feedback correction values CFBI1 to CFBI5 and CFBQ1 to CFBQ5 in the step 43 in FIG. 6 and the step 64 in FIG. 8, using the actual combustion timing IGn and the maximum combustion speed VMAXn, and the target combustion timing TIGn and the target maximum combustion speed TVMAXn, calculated as above during the first to fifth combustion time periods, the actual combustion timing IGn and the maximum combustion speed VMAXn are controlled such that they converge to the target combustion timing TIGn and the target maximum combustion speed TVMAX, respectively, in the respective combustion time periods.

As described above, according to the first embodiment, it is determined whether or not the catalyst 10 is in the activated state, and if the catalyst 10 is not in the activated state (NO to step 22), the value obtained by adding the first predetermined temperature TREF1 to the catalyst temperature TCAT is set as the target exhaust gas temperature TEMCMD. This makes it possible to set the target exhaust gas temperature TEMCMD which is suitable for the temperature of the catalyst 10 at the time. Therefore, by controlling the five fuel injection timings TINJn and the five fuel injection amounts QINJn for the multi-injection, using the target exhaust gas temperature TEMCMD, it is possible to raise the temperature of the catalyst 10, while preventing the temperature of exhaust gases from becoming too high. This makes it possible to rapidly activate the catalyst 10, while giving a higher priority to the reduction of the amount of emission of unburned fuel due to a rise in the temperature of exhaust gases to thereby excellently maintain reduced exhaust emissions.

Further, if it is determined that the catalyst 10 is in the activated state (YES to step 22), the target exhaust gas temperature TEMCMD is set to a temperature lower than the activation temperature TCATREF by the second predetermined temperature TREF2. This makes it possible to maintain the temperature of exhaust gases as low as possible, while preventing the temperature of the catalyst 10 from becoming too high or too low and properly maintaining the temperature and the purification ability of the catalyst 10. Therefore, it is possible to reduce the amount of emission of unburned fuel and CO and the like into the air to the maximum, which makes it possible to reduce exhaust emissions. Further, since it is possible to prevent the temperature of exhaust gases from being unnecessarily raised, it is possible to reduce the amount of fuel consumption by the corresponding amount.

Figure 13:
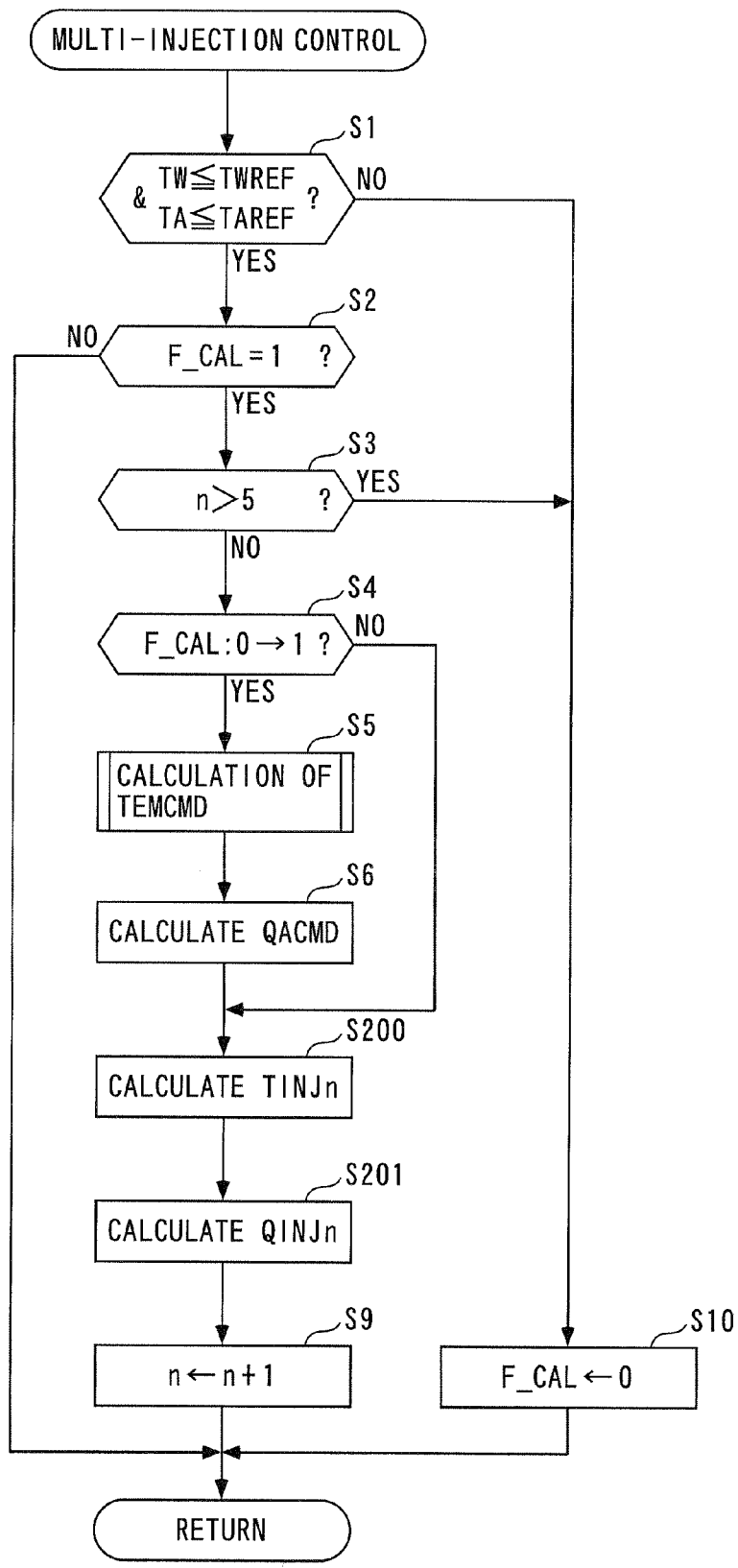
FIG. 13 is a main routine of a multi-injection control process executed by a temperature control device according to a second embodiment of the present invention.

FIG. 13 is a flowchart of a multi-injection control process executed by a temperature control device according to a second embodiment of the present invention. The second embodiment is distinguished from the first embodiment only in methods of calculating the fuel injection timing TINJn and the fuel injection amount QINJn in steps 200 and 201 in FIG. 13. That is, in the above-described first embodiment, the fuel injection timing TINJn is feedback-calculated such that the actual combustion timing IGn becomes equal to the target combustion timing TIGn, whereas in the second embodiment, the fuel injection timing TINJn is feedforward-calculated. Further, in the first embodiment, the fuel injection amount QINJn is feedback-calculated such that the maximum combustion speed VMAXn becomes equal to the target maximum combustion speed TVMAX, whereas in the second embodiment, the fuel injection amount QINJn is feedforward-calculated.

Specifically, in the step 200, a first ignition delay time period IGL1 is calculated. The first ignition delay time period IGL1 is an ignition delay time period associated with the first fuel injection, and is calculated according to the engine speed NE, the intake air amount QA, the intake air temperature TA, the intake air pressure PB, the EGR amount QEGR, the fuel pressure PF, the fuel property, the warming-up condition of the engine 3, the energized state of the glow plug 11, etc. Next, the first fuel injection timing TINJ1 is calculated by subtracting the first ignition delay time period IGL1 from the first target combustion timing TIG1 (=TIG1−IGL1). Further, in the case of the injection order n=2, the second fuel injection timing TINJ2 is calculated by subtracting a second ignition delay time period IGL2 calculated according to the same parameters as those used in the calculation of the first ignition delay time period IGL1 from the second target combustion timing TIG2. Furthermore, in the case of the injection order n=3 to 5, the third to fifth fuel injection timings TINJ3 to TINJ5 are calculated by subtracting third to fifth ignition delay time periods IGL3 to IGL5 calculated by the same calculation method as above from the third to fifth target combustion timings TIG3 to TIG5, respectively.

Further, in the step 201, the first fuel injection amount QINJ1 is calculated by searching a predetermined first fuel injection amount map (not shown) according to the engine speed NE, the demanded torque PMCMD, the target exhaust gas temperature TEMCMD, and the first fuel injection timing TINJ1. In the case of the injection order n=2 to 5, the second to fifth fuel injection amounts QINJ2 to QINJ5 are calculated by searching predetermined second to fifth fuel injection amount maps (none of which are shown) according to the engine speed NE, and the second to fifth fuel injection timings TINJ2 to TINJ5. As described above, in the second embodiment, the five fuel injection timings TINJn and the five fuel injection amounts QINJn for the multi-injection are set according to the operating conditions of the engine 3, including the engine speed NE.

It should be noted that the present invention is by no means limited to the above-described embodiments, but it can be practiced in various forms. For example, although in the above-described embodiments, if it is determined that the catalyst 10 is not in the activated state, the target exhaust gas temperature TEMCMD is calculated by adding the first predetermined temperature TREF1 to the catalyst temperature TCAT, the calculation method thereof is not limited to this, but for example, the target exhaust gas temperature TEMCMD may be set to be higher than the catalyst temperature TCAT by a predetermined temperature by multiplying the catalyst temperature TCAT by a certain coefficient which is more than 1. Further, although if it is determined that the catalyst 10 is in the activated state, the target exhaust gas temperature TEMCMD is calculated by subtracting the second predetermined temperature TREF2 from the activation temperature TCATREF, the calculation method thereof is not limited to this, but for example, the target exhaust gas temperature TEMCMD may be set to be lower than the activation temperature TCATREF by a predetermined temperature by multiplying the activation temperature TCATREF by an appropriate coefficient between 0 and 1.

Further, although in the first embodiment, as the combustion control parameters for controlling the temperature of the catalyst 10 according to the target exhaust gas temperature TEMCMD, both of the fuel injection timing TINJn and the fuel injection amount QINJn, which are fuel supply parameters, are used, only one of them may be used. Further, as the combustion control parameters, in place of the fuel supply parameters, or in combination with the same, another parameter having a correlation with the combustion state, such as the intake air amount or the EGR amount, may be used. In this case, as the target exhaust gas temperature TEMCMD is higher, the intake air amount or the EGR amount is controlled to be less, so as to make the temperature of exhaust gases higher.

Further, although in the above-described embodiments, the catalyst temperature TCAT is estimated using the pre-catalyst exhaust gas temperature TCATB and the post-catalyst exhaust gas temperature TCATA respectively detected by the pre-catalyst exhaust gas temperature sensor 28 and the post-catalyst exhaust gas temperature sensor 29, the catalyst temperature TCAT may be estimated using one of these temperature, or may be directly detected by a sensor provided in the catalyst 10.

Further, although in the above-described embodiments, the number of times of injections of fuel for the multi-injection for activating the catalyst 10 is 5, it may be a desired number not less than 1. Furthermore, although in the above-described embodiments, the catalyst 10 is an oxidation catalyst, any other desired catalyst, e.g. a three-way catalyst or an NOx catalyst may be used.

Furthermore, although in the above-described embodiments, the present invention is applied to the diesel engine installed on a vehicle, this is not limitative, but it can be applied to various engines other than a diesel engine, e.g. a gasoline engine, and engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. A temperature control device for a catalyst for controlling temperature of the catalyst which purifies exhaust gases discharged from an internal combustion engine, comprising:
   temperature measuring means for measuring a temperature of the catalyst, the temperature measuring means including at least one of a pre-catalyst exhaust gas sensor, a post-catalyst exhaust gas sensor, and a sensor provided in the catalyst;
   activated state-determining means for determining based on the measured temperature of the catalyst whether or not the catalyst is in an activated state;
   target exhaust gas temperature-setting means for setting a temperature which is higher than the temperature of the catalyst by a first predetermined temperature, as a target exhaust gas temperature, when said activated state-determining means determines that the catalyst is not in the activated state, and setting a temperature which is lower than a predetermined activation temperature by a second predetermined temperature, as the target exhaust gas temperature, when it is determined that the catalyst is in the activated state;
   fuel supply means for supplying fuel at a plurality of different times to the engine; and
   control means for controlling a fuel supply parameter including at least one of each supply amount and each supply timing of fuel to be supplied at the plurality of different times by said fuel supply means, according to said set target exhaust gas temperature.

2. The temperature control device of claim 1, wherein the first predetermined temperature is higher than the second predetermined temperature.

* * * * *